(12) United States Patent
Shi et al.

(10) Patent No.: US 8,623,179 B2
(45) Date of Patent: *Jan. 7, 2014

(54) SEAWATER DESALINIZATION DEVICE

(75) Inventors: Zheng Shi, Shenzhen (CN); Jiang-Feng Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 283 days.

This patent is subject to a terminal disclaimer.

(21) Appl. No.: 12/981,513

(22) Filed: Dec. 30, 2010

(65) Prior Publication Data

US 2012/0103783 A1     May 3, 2012

(30) Foreign Application Priority Data

Oct. 27, 2010     (CN) .......................... 2010 2 0579157

(51) Int. Cl.
*B01D 3/42*     (2006.01)
*C02F 1/14*     (2006.01)

(52) U.S. Cl.
USPC ........... 202/234; 126/652; 126/698; 126/708; 159/44; 159/903; 202/181; 202/190; 203/1; 203/10; 203/100; 203/DIG. 1; 203/DIG. 17

(58) Field of Classification Search
USPC ....... 126/652, 698, 708; 159/44, 903, DIG. 1, 159/DIG. 15; 202/181, 190, 234, 242, 202/267.1; 203/1, 10, 86, 100, DIG. 1, 203/DIG. 17, DIG. 18

See application file for complete search history.

(56) References Cited

U.S. PATENT DOCUMENTS

| | | | | |
|---|---|---|---|---|
| 3,870,605 | A * | 3/1975 | Sakamoto | 202/234 |
| 4,010,080 | A * | 3/1977 | Tsay et al. | 202/83 |
| 4,622,102 | A * | 11/1986 | Diebel | 202/185.3 |
| 4,687,550 | A * | 8/1987 | Wong | 202/165 |
| 6,274,004 | B1 * | 8/2001 | Andersen | 202/234 |
| 6,280,577 | B1 * | 8/2001 | Wang | 202/185.3 |
| 6,439,298 | B1 * | 8/2002 | Li | 165/104.33 |
| 6,582,563 | B1 * | 6/2003 | Adam et al. | 203/11 |
| 6,830,661 | B1 * | 12/2004 | Land | 202/83 |
| 7,927,463 | B2 * | 4/2011 | Fang | 202/163 |
| 2004/0134847 | A1 * | 7/2004 | Lin | 210/202 |
| 2006/0180460 | A1 * | 8/2006 | Nagler | 202/234 |
| 2010/0330639 | A1 * | 12/2010 | Lee | 435/161 |
| 2011/0120854 | A1 * | 5/2011 | Lee | 203/86 |

\* cited by examiner

*Primary Examiner* — Virginia Manoharan
(74) *Attorney, Agent, or Firm* — Altis Law Group, Inc.

(57) ABSTRACT

A seawater desalinization device includes a container portion, a guiding pipe, a plug, a heat conduction cover, a switch, and a connecting pipe. The container portion defines a receiving chamber, a slot, and a through hole communicating with the receiving chamber. The guiding pipe is fixed on the container portion to communicating with the slot. The plug is detachably inserted into the guiding pipe. The heat conduction cover covers on the container portion and sealing the receiving chamber and the slot. The switch is assembled in the container portion to control open or close the through hole upon a seawater level in the container portion. The connecting pipe is inserted into the through hole and a seawater source.

3 Claims, 5 Drawing Sheets

SEAWATER DESALINIZATION DEVICE

CROSS-REFERENCE TO RELATED APPLICATIONS

This application is one of the three related co-pending U.S. patent applications listed below. All listed applications have the same assignee and were concurrently filed herewith. The disclosure of each of the listed applications is incorporated by reference into all the other listed applications.

| Title | | Inventors |
|---|---|---|
| 12/981,524 | SEAWATER DESALINIZATION DEVICE | Shi et al. |
| 12/981,513 | SEAWATER DESALINIZATION DEVICE | Shi et al. |
| 12/981,515 | SEAWATER DESALINIZATION SYSTEM | Shi et al. |

BACKGROUND

1. Technical Field

The present disclosure generally relates to seawater desalinization devices.

2. Description of Related Art

It is well known that fresh water is the essential resources for human beings. However, with continuously worsen of environmental; the useable fresh water is facing pollution and becoming exhausted in the large-scale. About 70% of the earth is covered by seawater. People design seawater desalinization devices to desalinate seawater to obtain the fresh water. However, the seawater desalinization devices usually have complex structures and higher cost. Furthermore, the seawater desalinization devices usually adopt chemical method to desalinate seawater to obtain the fresh water. Therefore, the fresh water may be affected healthy. In addition, the seawater desalinization devices usually need to be added seawater by users. Therefore, it is inconvenient to use.

Therefore, there is room for improvement within the art.

BRIEF DESCRIPTION OF THE DRAWINGS

Many aspects of the seawater desalinization device can be better understood with reference to the following drawings. The components in the drawings are not necessarily to scale, the emphasis instead being placed upon clearly illustrating the seawater desalinization device. Moreover, in the drawings, like reference numerals designate corresponding parts throughout the several views.

DETAILED DESCRIPTION

Figure 1:
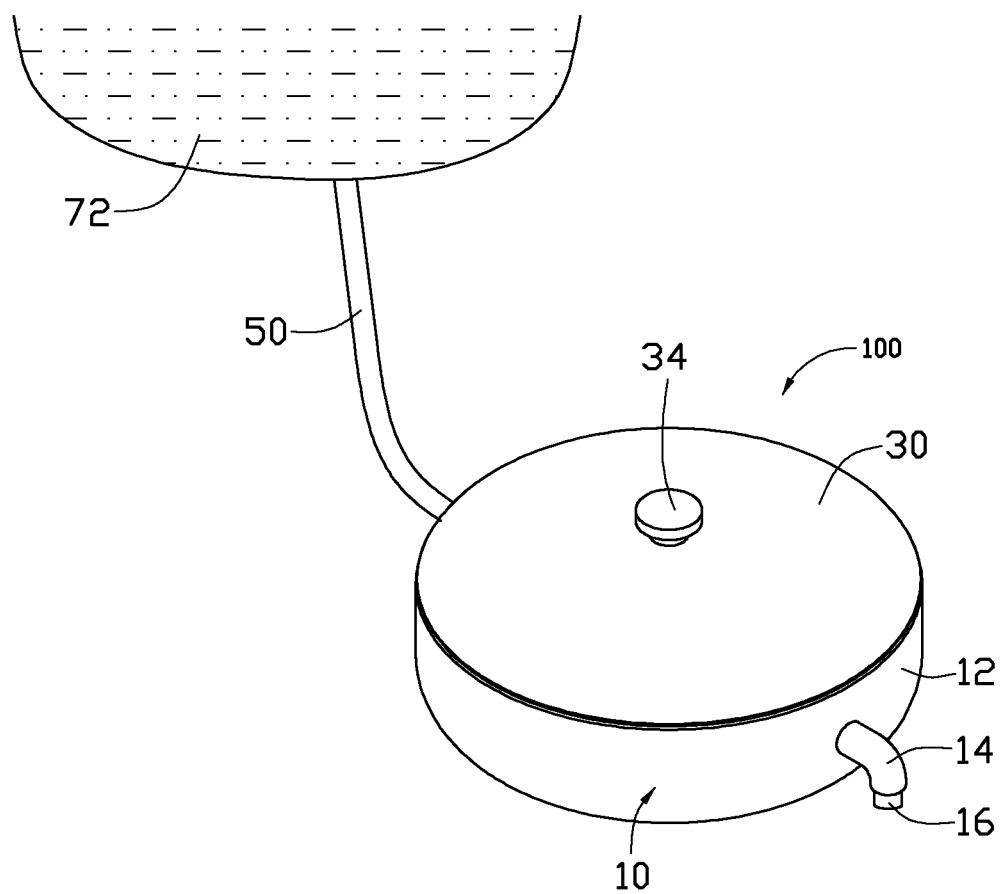
FIG. 1 is an isometric view of a seawater desalinization device, according to an exemplary embodiment.
Figure 2:
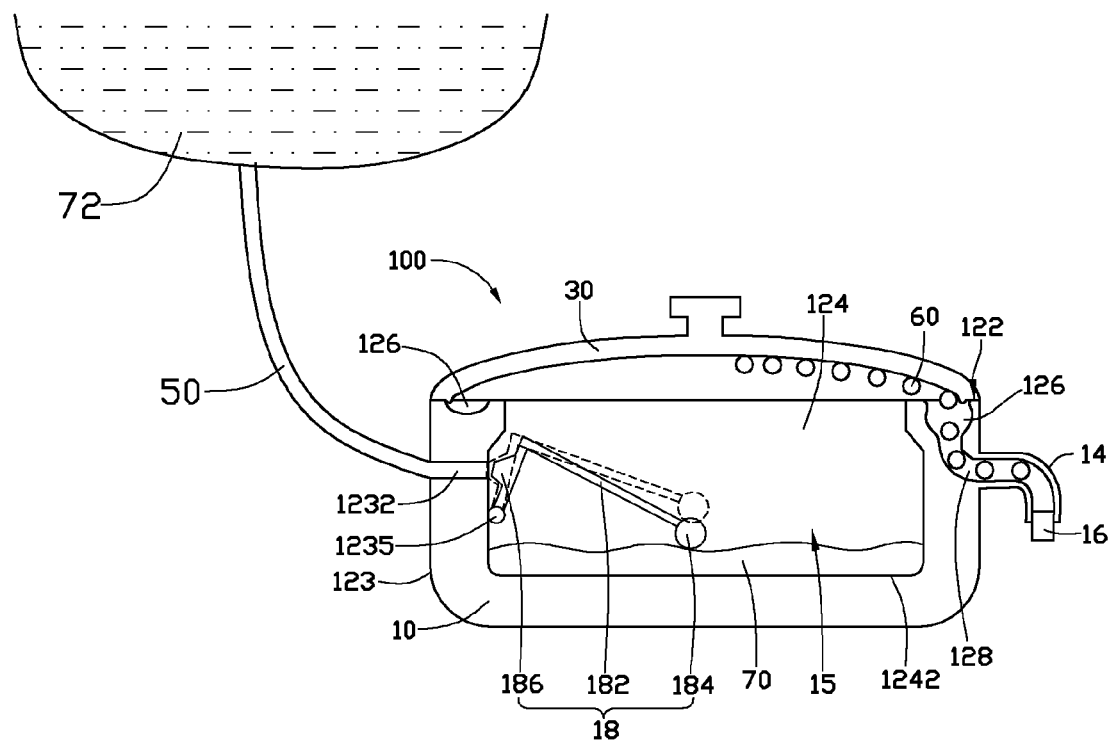
FIG. 2 is a schematic view of the seawater desalinization device of FIG. 1 showing an inside work principle.

FIG. 1 and FIG. 2 show an exemplary embodiment seawater desalinization device 100 including a container portion 10, a heat conduction cover 30 covering on the container portion 10, and a connecting pipe 50 fixed on the container portion 10. The connecting pipe 50 is configured for guiding the seawater from a seawater source 72 into the container portion 10.

Figure 3:
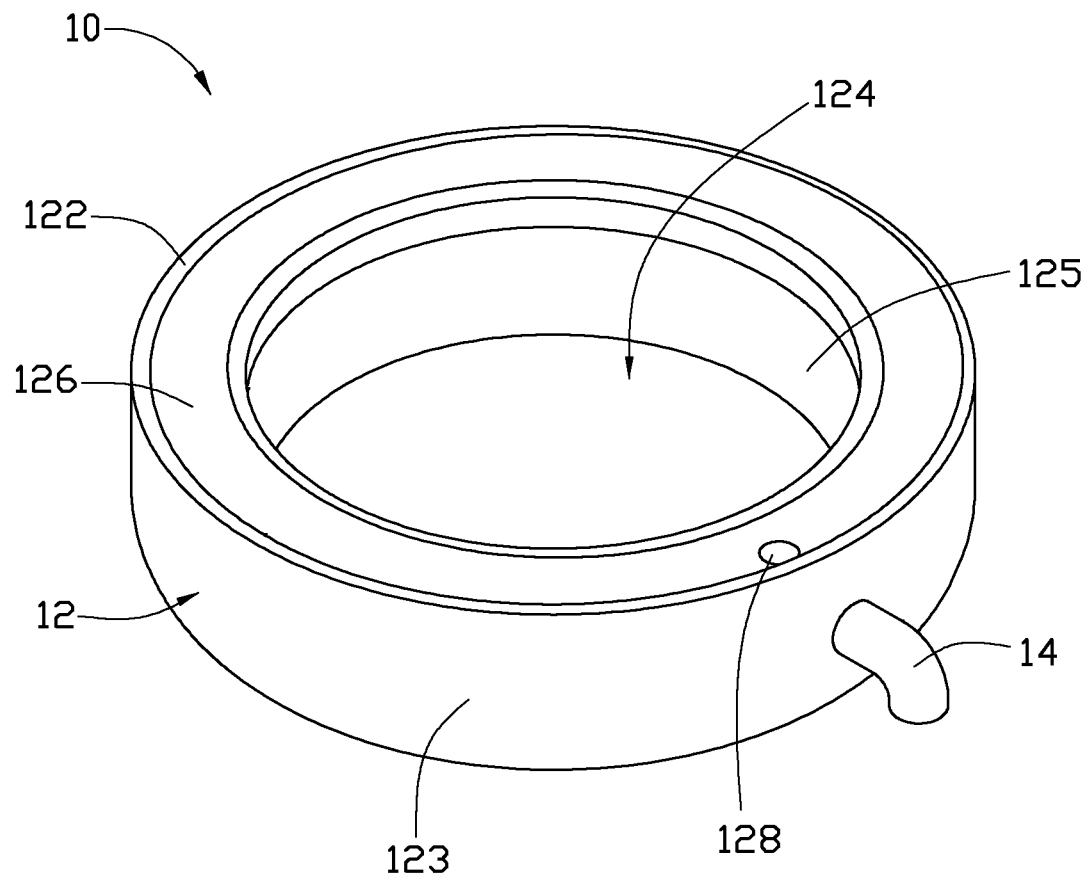
FIG. 3 is an isometric view of a container portion of the seawater desalinization device shown in FIG. 2.

Referring to FIG. 3, the container portion 10 may be made of stainless steel for containing seawater. The container portion 10 includes a main body 12, a guiding pipe 14 fixed on the main body 12, a plug 16, and a switch 18 rotatably assembled in the main body 12.

The main body 12 includes a top portion 122 and a peripheral wall 123. The top portion 122 defines a receiving chamber 124, a ring slot 126, and a hole 128. The receiving chamber 124 is for receiving seawater. In the exemplary embodiment, an inner wall 1242 of the receiving chamber 124 is coated by a heat absorption layer 125 for absorbing solar energy to heat the seawater. The slot 126 is defined around the receiving chamber 124 for storing fresh water. The cross-sectional view of the slot 126 is substantially semi-circular for reducing resistance to guide the fresh water 60 flowing into the hole 128. The hole 128 is defined in a bottom wall of the slot 126 for connecting the slot 126 to the guiding pipe 14. In this exemplary embodiment, the bottom wall of the slot 126 is an inclined plane and the hole 128 defined at the lowest portion of the slot 126 shown in FIG. 2. Therefore, the fresh water 60 can automatically flow into the hole 128. The peripheral wall 123 defines a through hole 1232 communicating with the receiving chamber 124. An end of the connecting pipe 50 is inserted into the through hole 1232, and the other end of the connecting pipe 50 is connected to the seawater source 72. A rod 1235 is fixed on the inner wall 1242.

The guiding pipe 14 is fixed on the peripheral wall 123 and communicates with the hole 128. Therefore, the fresh water 60 can flow out of the guiding pipe 14 through the hole 128. The plug 16 may be made of rubber detachably assembled in an opening end of the guiding pipe 14.

The switch 18 includes a connecting post 182, a buoy 184, and a stopper element 186. The connecting post 182 is substantially L-shaped, and an end of the connecting post 182 is connected to the buoy 184. The other end of the connecting post 182 is rotatably assembled to the rod 1235. The stopper element 186 is fixed on the connecting post 182 adjacent to the rod 1235. The buoy 184 can float on a surface of the seawater 70 stored in the container portion 10. When the level of seawater 70 increases, the stopper element 186 can be inserted into the through hole 1232, and when the level of seawater 70 decreases, the stopper element 186 can be removed from the through hole 1232.

Figure 4:
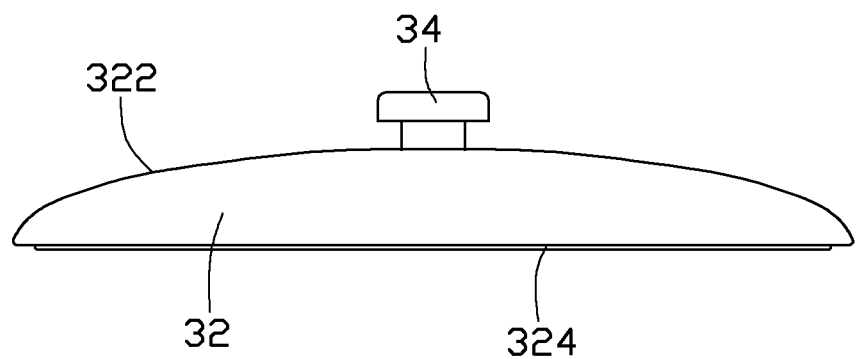
FIG. 4 is an isometric view of a heat conduction cover of the seawater desalinization device shown in FIG. 1.
Figure 5:
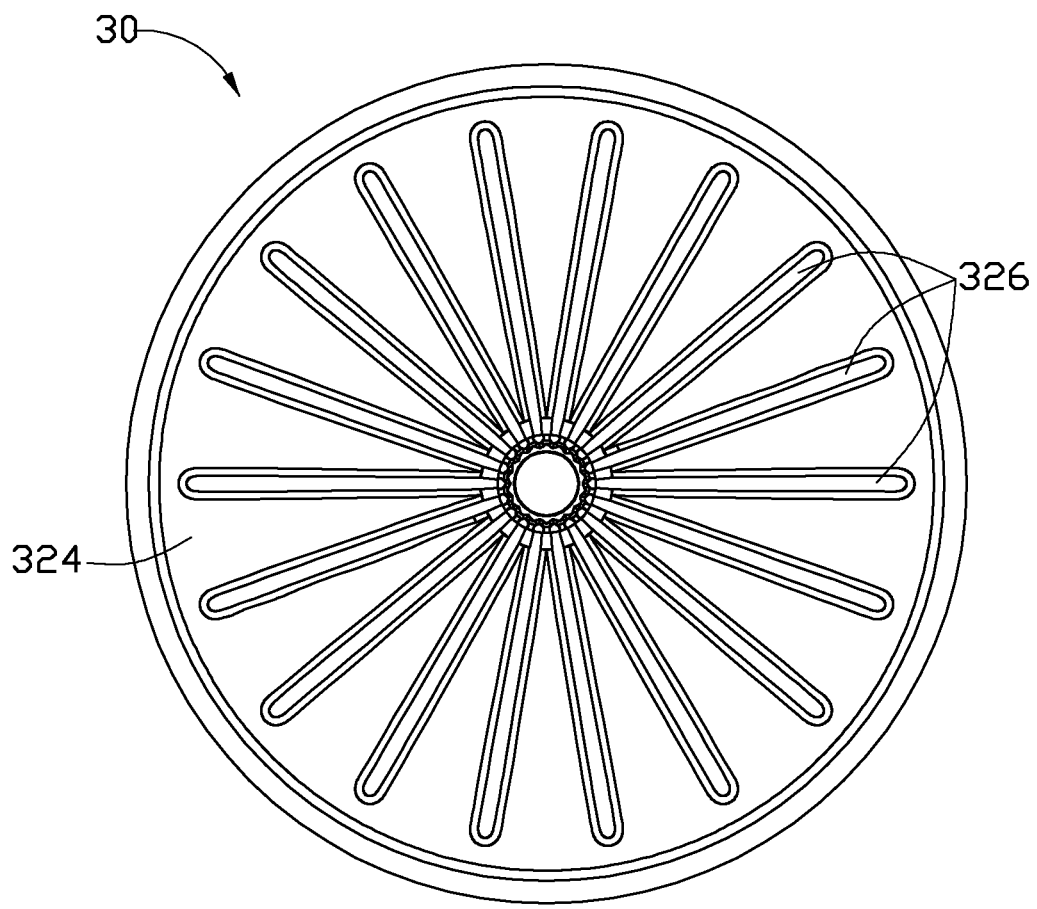
FIG. 5 is an isometric view of the heat conduction cover, but shown from another angle.

Referring to FIG. 4 and FIG. 5, the heat conduction cover 30 includes a cover portion 32 and a handle 34 positioned on the cover portion 32. The cover portion 32 may be made of transparent toughened glass. In the exemplary embodiment, the cover portion 32 is a convex lens for focusing solar energy. The cover portion 32 includes a first surface 322 and an opposite second surface 324. The handle 34 is fixed on a center of the first surface 322. A plurality of guiding slots 326 are defined in the second surface 324. The guiding slots 326 take a position of the handle 34 as a radiation center and are defined in the second surface 324. The fresh water 60 can be stored in the guiding slots 326 and can automatically drop into the slot 126 due to gravity.

When the seawater desalinization device 100 is to be used, the desalinization device 100 is placed below the seawater source 72, and the seawater 70 is filled in the container portion 10. Therefore, the buoy 184 floats on the surface of the seawater 70 and the stopper element 186 is inserted into the through hole 1232. Then the heat conduction cover 30 is sealingly positioned on the main body 12 and the plug 16 is inserted into the guiding pipe 14. Therefore, a sealing cavity 15 is defined in the container portion 10. The container portion 10 is heated; the heat absorption layer absorbs solar energy to increase the temperature of the seawater 70. Therefore, the fresh water 60 can be evaporated from the seawater 70. The fresh water 60 is gathered on the second surface 324 and flows along the guiding slots 326, and then the fresh water 60 drops into the slot 126. Because the hole 128 is defined at lowest portion of the slot 126, the fresh water 60 automatically flows into the hole 128 and is stored in the guiding pipe 14. The seawater 70 stored in the sealing cavity 15 gradually decreases, the buoy 184 drives the connecting post 182 move to a bottom of the receiving chamber 124, and the stopper element 186 is detached from the through hole 1232 to communicate the seawater source 72 with the receiving chamber 124. However, the sealing cavity 15 is in a sealed state, the seawater of the seawater source 72 can not flow into the container portion 10.

When the plug 16 is detached from the guiding pipe 14, the fresh water 60 stored in the guiding pipe 14 flows out of the container portion 10. A pressure of the sealing cavity 15 gradually decreases, and a pressure of seawater source 72 is higher than the pressure of the sealing cavity 15. Therefore, the seawater of the seawater source 72 automatically flows into the sealing cavity 15. When the seawater 70 gradually increases, the buoy 184 drives the connecting post 182 to move towards the heat conduction cover 30, and the stopper element 186 is inserted into the through hole 1232 to keep the seawater of the seawater source 72 from flowing into the sealing cavity 15. Then the plug 16 is inserted into the guiding pipe 14 to seal the sealing cavity 15.

The fresh water 60 is obtained by physical vapor method, thereby the fresh water 60 is safe to drink. Furthermore, the seawater desalinization device 100 can automatically guide the seawater into the sealing cavity 15, therefore, the seawater desalinization device 100 is convenient to use.

In another embodiment, the guiding slots 326 can be omitted, the fresh water 60 evaporated from the seawater can attach to the second surface 324 and drop into the slot 126.

In another embodiment, the switch 18 can be an electronic sensor for detecting the seawater 70 stored in the sealing cavity 15. The electronic sensor can automatically control the stopper element 186 inserted into or detached from the through hole 1232 upon the desired seawater level.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A seawater desalinization device, comprising:
   a container portion defining a receiving chamber for storing seawater, a slot, and a through hole communicating with the receiving chamber, a heat absorption layer coated on an inner wall of the receiving chamber;
   a guiding pipe fixed on the container portion to communicating with the slot;
   a plug detachably inserted into the guiding pipe;
   a heat conduction cover covering on the container portion and sealing the receiving chamber and the slot, the heat conduction cover made of transparent toughened glass comprising a cover portion which is a convex lens for focusing solar energy and the heat conduction cover making fresh water evaporated from the seawater to drop into the slot, the heat conduction cover defining a plurality of guiding slots facing the container portion;
   a switch assembled in the container portion to control the through hole to open or close upon a seawater level which stored in the container portion; and
   a connecting pipe connected to the through hole and a seawater source;
   wherein the plurality of guiding slots take a center of the heat conduction cover as a radiation center and are defined in the heat conduction cover; a bottom wall of the slot is an inclined plane and a hole is defined at the lowest portion of the slot, the cross-sectional view of the slot is semi-circular; the heat absorption layer absorbs the solar energy to increase the temperature of the seawater, and the fresh water is evaporated from the seawater and gathered on the cover portion; the fresh water is stored in the plurality of guiding slots and automatically drops into the slot due to gravity and is stored in the guiding pipe.

2. The seawater desalinization device as claimed in claim 1, wherein the switch comprises a connecting post, a buoy, and a stopper element; a first end of the connecting post is rotatably assembled in the receiving chamber, a second end opposite to the first end connects to the buoy; the buoy floats on the seawater to control the stopper element inserted into or detached from the through hole upon the seawater level.

3. The seawater desalinization device as claimed in claim 1, wherein the switch comprises an electronic sensor and a stopper element; the electronic sensor automatically controls the stopper element inserted into or detached from the through hole upon the seawater level.

* * * * *